United States Patent [19]

Wollin et al.

[11] 3,964,774
[45] June 22, 1976

[54] IRRIGATION LINE COUPLER

[75] Inventors: David W. Wollin, Eugene, Oreg.;
James E. Cook, Oakland, Calif.

[73] Assignee: IRECO Industries, Inc., Eugene, Oreg.

[22] Filed: Mar. 14, 1975

[21] Appl. No.: 558,270

[52] U.S. Cl. .............................. 285/409; 285/349; 292/256.69; 24/270
[51] Int. Cl.² ....................................... F16L 23/00
[58] Field of Search ........... 285/365, 373, 367, 419, 285/409, 420, 410, 5, 7, 252, 349; 24/285, 19, 271, 268, 269, 270, 272, 273, 274, 275, 276, 277, 278, 279, 280, 281, 282, 283, 284, 286; 292/256.65, 256.67, 256.69; 403/338, 344

[56] References Cited
UNITED STATES PATENTS

| | | | |
|---|---|---|---|
| 1,740,957 | 12/1929 | Phillips | 292/256.69 |
| 2,659,954 | 11/1953 | Woolsey | 24/279 |
| 3,081,862 | 3/1963 | Knoedler | 24/270 |

FOREIGN PATENTS OR APPLICATIONS

| | | | |
|---|---|---|---|
| 2,026,158 | 9/1971 | Germany | 285/409 |
| 583,719 | 12/1946 | United Kingdom | 24/280 |

*Primary Examiner*—Dave W. Arola
*Attorney, Agent, or Firm*—Klarquist, Sparkman, Campbell, Leigh, Hall & Whinston

[57] ABSTRACT

Flanged coupler ends are pressed together by channel-like arcuate segments hingedly and expansibly connected at one end of each segment by a resilient member, and releasably latched together at their other ends.

2 Claims, 3 Drawing Figures

IRRIGATION LINE COUPLER

DESCRIPTION

This invention relates to an improved irrigation line coupler, and has for an object thereof the provision of an improved irrigation line coupler having an extensible locking band.

Another object of the invention is to provide an improved irrigation line coupler having a locking band provided with an extensible link serving as a hinge for rigid arcuate sections thereof.

A further object of the invention is to provide an extensible locking band which can be used with irrigation coupler members varying in dimensions.

Figure 1:
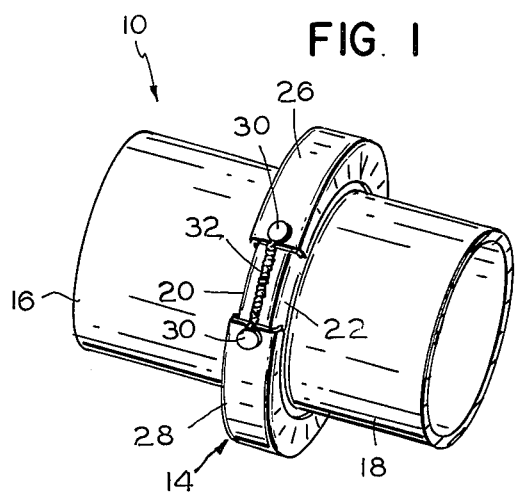
FIG. 1 is a fragmentary, perspective view of an irrigation coupler forming one embodiment of the invention.
Figure 2:
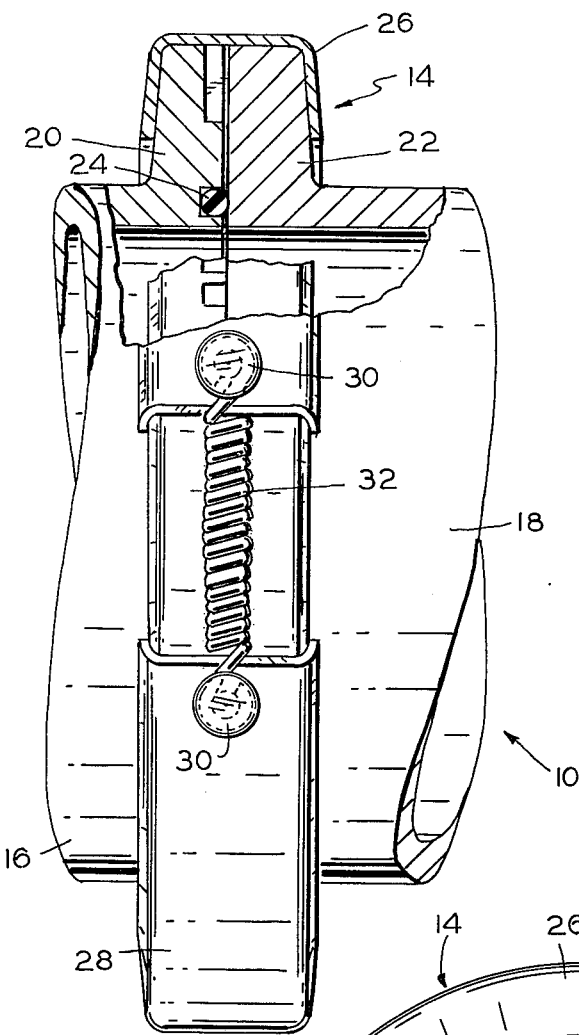
FIG. 2 is an enlarged, fragmentary, partly sectional side elevation view of the coupler of FIG. 1.
Figure 3:
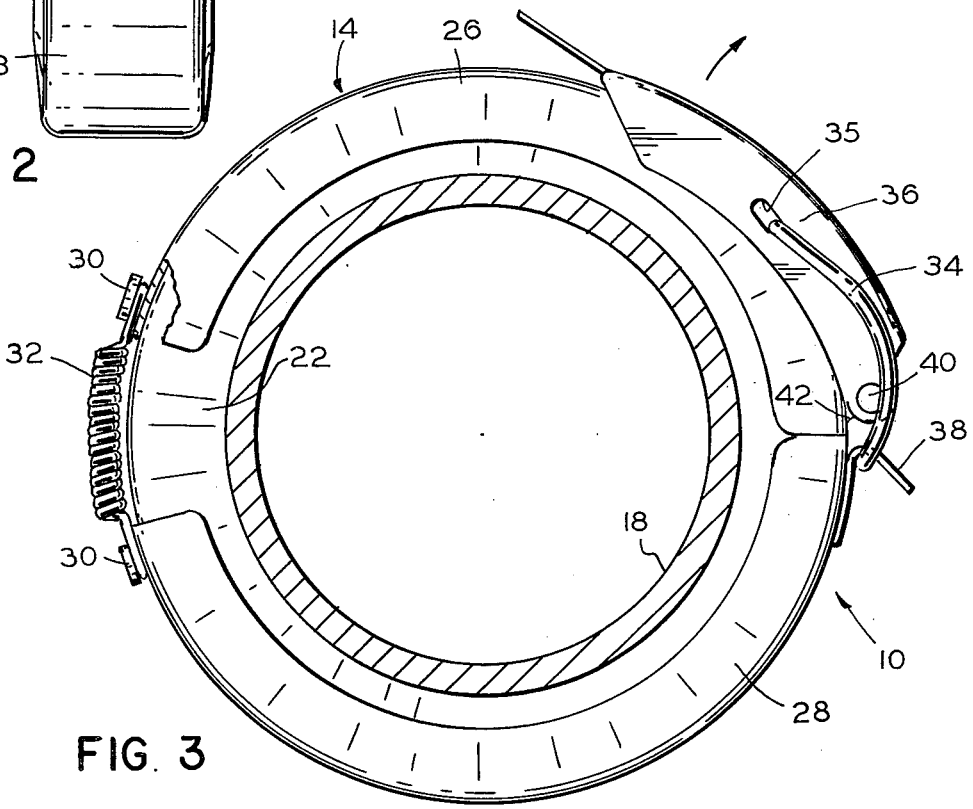
FIG. 3 is an enlarged vertical sectional view of the coupler of FIG. 1.

Referring now in detail to the drawings, there is shown therein a pipe coupler 10 forming one embodiment of the invention and forming a part of an irrigation line. The coupler includes an extensible locking band 14 and also includes tubular coupler halves 16 and 18 having end flanges 20 and 22. The locking band presses the flanged ends of the coupler halves toward each other and into sealing engagement with a gasket 24. The locking band includes rigid, channel-like, arcuate segments 26 and 28 secured by rivets 30 to eye ends of a strong, flexible, tension spring 32. The spring serves to permit the band to expand when necessary and also serves as a hinge between the arcuate segments. An arcuate U-shaped, bail 34 has hooked ends extending through slots 35 in sides of a channel-like arcuate lever 36, and is releasably hooked by a hook 38 welded to one end portion of the segment 28. The bail is rigid and arcuate. The lever 36 is pivotally mounted by a rivet 40 to a sleeve 42 welded to one end portion of the segment 26. The lever may be swung between a slack-creating release position extending on beyond the segment 26 and a closed or latching position (shown in FIG. 3) folded back on the segment 26. In the latching position of the lever, the spring 32 is tensioned and the lever is in a slightly overcenter position relative to its pivot axis so that the spring acts to keep the lever closed.

The arcuate segments 26 and 28 press the end flanges toward each other around substantially their entire peripheries. The spring 32 enables the band to be used with couplers having varying diameters and/or varying flange thicknesses, as occurs, for example, in odd mating couplers. If desired, in place of the spring, a connector of expansible metal, extra strong teflon or stretchable, steel supported rubber cord could be used. Also, instead of rivets, the spring or other element could be hooked into the rivet holes or screws or welds could be used.

In another possible alternative, the spring could be omitted, the ends of the segments away from the bail be hinged together and the bail itself be resiliently expansible or be connected to a resiliently expansible element. For example, the central portions of the bail could be coiled to provide a strong spring hinge, or the central portions of the bail could be flattened in transverse cross-section to permit easier flexing and extension.

What is claimed is:

1. In an improved irrigation coupler,
   a pair of coupler halves having end flanges,
   and locking band means including a pair of rigid, channel-like arcuate segments, hinge means comprising a coiled tension spring connecting one end of each segment together and latching means for releasably connecting the other ends of the segments together,
   the tension spring having eye end portions and rivets securing the eye end portions to the arcuate segments in positions in which the eye portions are flat against the arcuate segments.

2. In an improved locking band for an irrigation coupler,
   a pair of channel-like arcuate segments,
   hinge means connecting one end of one segment to one end of the other segment,
   and releasable latching means for releasably connecting the other ends of the segments together,
   the hinge means comprising a coiled tension spring having eyes at its ends, and fastener means connecting the eyes to the segments with the eyes flat against the segments.

* * * * *